United States Patent [19]

Nakao et al.

[11] Patent Number: 4,805,928
[45] Date of Patent: Feb. 21, 1989

[54] RECLINING MECHANISM OF BABY CARRIAGE

[75] Inventors: Shinroku Nakao, Kanagawa; Yoshiyuki Suzuki; Hitoshi Kato, both of Tokyo, all of Japan

[73] Assignee: Combi Co., Ltd., Tokyo, Japan

[21] Appl. No.: 76,802

[22] Filed: Jul. 23, 1987

[30] Foreign Application Priority Data

Jul. 23, 1986 [JP] Japan ............................ 61-113055[U]
Jul. 23, 1986 [JP] Japan ............................ 61-113056[U]
Jul. 23, 1986 [JP] Japan ............................ 61-113057[U]
Aug. 22, 1986 [JP] Japan ............................ 61-127982[U]
Aug. 22, 1986 [JP] Japan ............................ 61-127983[U]
Aug. 22, 1986 [JP] Japan ............................ 61-127984[U]

[51] Int. Cl.⁴ ............................................. A61G 5/00
[52] U.S. Cl. ................................... 280/642; 280/650; 280/47.4; 297/61; 297/377
[58] Field of Search ............... 297/61, 356, 377, 408; 280/642, 647, 650, 649, 47.4

[56] References Cited

U.S. PATENT DOCUMENTS

| | | | |
|---|---|---|---|
| 3,649,074 | 3/1972 | McDonald et al. | 297/377 X |
| 4,084,849 | 4/1978 | Ishida et al. | 297/377 X |
| 4,435,012 | 3/1984 | Kassai | 297/377 X |
| 4,487,453 | 12/1984 | Emmerich | 297/377 X |

FOREIGN PATENT DOCUMENTS 54-16268 6/1979 Japan.
58-33149 7/1983 Japan.
58-35572 8/1983 Japan.

Primary Examiner—David M. Mitchell
Assistant Examiner—Michael Mar
Attorney, Agent, or Firm—Sughrue, Mion, Zinn, Macpeak & Seas

[57] ABSTRACT

A reclining mechanism for controlling the inclination angle of a back rest in a baby carriage includes a horizontal cross bar connected to two vertical frame bars to form a U-shape. On the back of the backrest, a rack having several horizontal grooves can selectively engage the cross bar. A vertically movable releasing plate has inclined surfaces so that the cross bar can be raised out of the grooves against the biasing force of a pressure plate. The cross bar is connected to a head protection plate which rotates and closes off the top of the back rest when the back rest is reclined by sliding the cross bar down the rack.

9 Claims, 11 Drawing Sheets

RECLINING MECHANISM OF BABY CARRIAGE

BACKGROUND OF THE INVENTION

The present invention relates to a stroller or baby carriage for transporting or carrying a baby. Particularly, the invention relates to a reclining mechanism for changing the inclination angle of a backrest of a baby carriage. More particularly, it is related to a reclining mechanism of a baby carriage which has a protection plate connected to the upper end of the backrest so as to be able to be raised and lowered corresponding to the change of inclination angle of the backrest.

Taking a baby or an infant out in the open air for a walk or for sun-bathing is necessary for the baby or infant to grow up healthy. It is, however, very uncomfortable for a guardian of the baby or infant to hold or carry the baby or infant either in the arms or on the back for a long time. On other hand, it is never desirable for the health of a growing baby or infant to be kept in a rigid posture for a long time.

To cope with those problems, baby carriages have been developed and a number of excellent improvements have so far been worked out in those baby carriages.

The improvements in those baby carriages have been directed to a so-called full-reclining mechanism which has been developed to optimize the use of those baby carriages corresponding to the conditions of the babies laid on the baby carriages, that is, corresponding to the waking condition and the sleeping condition of the babies. Those baby carriages have been so designed that the backrest for supporting the back of a baby could be kept in an about 90-degrees erected state when the baby is awake and that the inclination angle of the backrest could be brought close to a flat state to thereby combine the seat and the backrest to form a bed when the baby is asleep or nearly asleep.

However, those conventionally known mechanisms have the disadvantage that the angle changing mechanism is complex, for example, the inclination angle should be changed by changing the position where the backrest is engaged with the top ends of links respectively interposed between the handle bar and the opposite ends of the backrest. The known mechanisms have the inconvenience that the angle changing operation must be independently carried out on both left and right sides because the angle changing mechanism is separately attached to the opposite sides of the backrest and that use of both hands is necessary for one operation.

Further, in the known baby carriages, the angle of the backrest relative to the seat can be merely changed corresponding to the erected/fallen state of the backrest. Accordingly, for example, when the flat state of the seat and backrest is established to be full-reclining, the baby laid on the seat and backrest often gradually moves up because of the vibrations caused by the movement of the baby carriage or because of turning over in sleep of the baby. As the baby moves upwards, the head of the baby or the upper half of the body of the baby is exposed out of the upper surface of the backrest. In the worst case, the baby may drop out of the baby carriage from the upper end of the backrest.

SUMMARY OF THE INVENTION

The present invention has been attained to cope with those problems. Therefore, it is an object of the present invention to provide a reclining mechanism of a baby carriage which is so arranged that a backrest locked at a predetermined inclination angle can be easily shifted by single-handed operation so as to be locked at another inclination angle.

It is another object of the invention to provide a reclining mechanism of a baby carriage, in which a baby head protection plate is pivotally attached to the upper end of the backrest so as to be able to be raised and lowered to thereby selectively provide an upper end closure.

It is a yet further object of the invention to provide a baby carriage in which the baby head protection plate is so arranged as to rise and fall in response to the changing operation (reclining operation) of the inclination angle of the backrest to thereby prevent the head or body of a baby laid on the seat and backrest from dropping out of the upper end of the backrest.

The present invention can be summarized as an inclination angle adjusting bar for a baby carriage including frame bars and a cross bar so as to be substantially U-shaped in front views. The frame bars are pivotally attached at opposite ends of the frame bars to a body of the baby carriage so as to be able to be pivotally raised and lowered to a predetermined position of the body of the baby carriage. The cross bar is positioned so as to cross the rear surface of a backrest. The cross bar of the inclination angle adjusting bar mechanism is provided at a center of the rear surface of the backrest.

A aspect of the invention includes a reclining mechanism of a baby carriage wherein a baby head protection plate is pivotally attached to the upper end of the backrest so as to be able to be raised and lowered to thereby close the upper end. The baby head protection plate is so arranged as to be raised and lowered in response to the inclination angle adjusting bar to thereby prevent the head of a baby laid on the backrest from flying out of the upper end of the backrest and to prevent the body of the baby from dropping out of the upper end of the backrest.

BRIEF DESCRIPTION OF THE DRAWINGS

The drawings show embodiments of the present invention.

DETAILED DESCRIPTION OF THE PREFERRED EMBODIMENTS

Referring to the accompanying drawings, an embodiment of the invention will be described hereunder.

Figure 1:
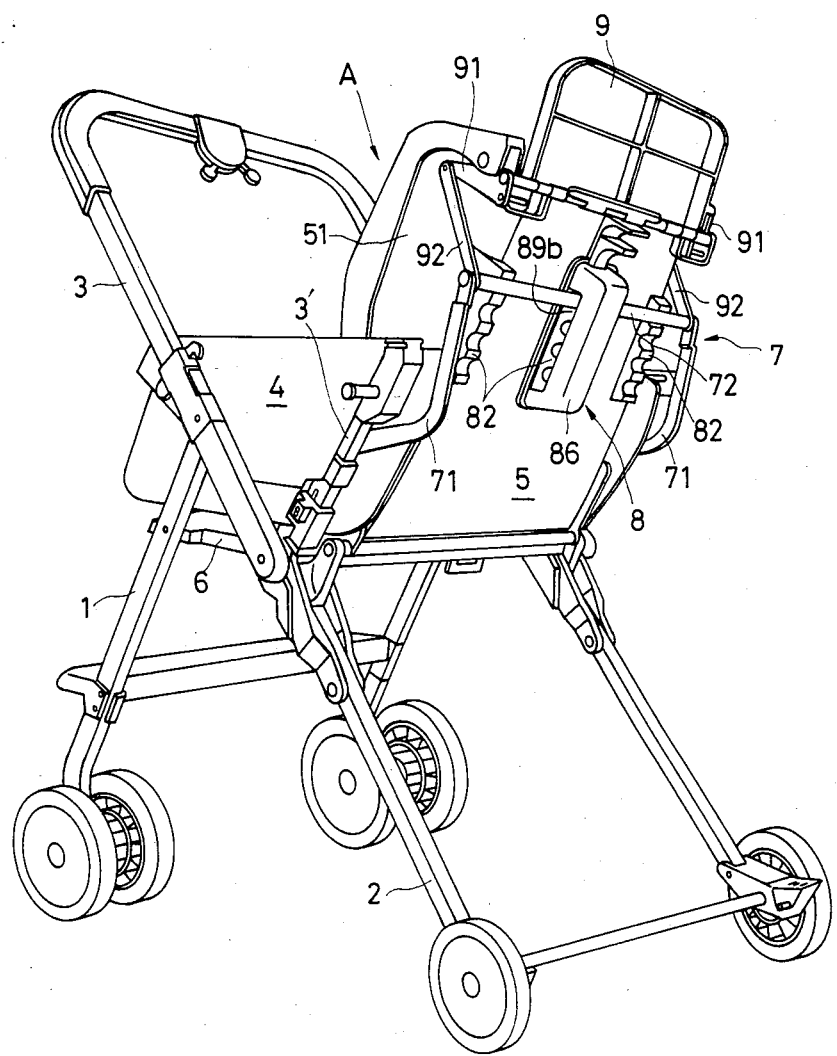
FIG. 1 is a perspective view of a baby carriage showing the condition that the handle bar has been turned to the front of the seat (the condition that the handle bar has been placed on the position facing the baby) and that the backrest has been raised.

As shown in FIG. 1, in a baby carriage A, front leg bars 1, rear leg bars 2, a handle bar 3, bearing bars 3 and armrest bars 4 are foldably coupled and assembled to constitute a body of the baby carriage A. Each of the armrest bars 4 is interposed between a pivot portion where the upper ends of one front leg bar 1 and one rear leg bar 2 pivot about each other at one place and one bearing bar 3' vertically erected from the longitudinally middle portion of the rear leg bar 2. The handle bar 3 is pivotally attached to the lower end portions of the bearing bars 3' so as to be able to swing back and forth.

A backrest 5 is pivotally attached to the rear end of a seat 6 so that the inclination angle can be adjusted. A pair of side frames 51 are respectively formed on both sides of the backrest 5 so as to rise a little above the back rest 5 to thereby guard the body of the baby and prevent the body of the baby from moving out.

Figure 6:
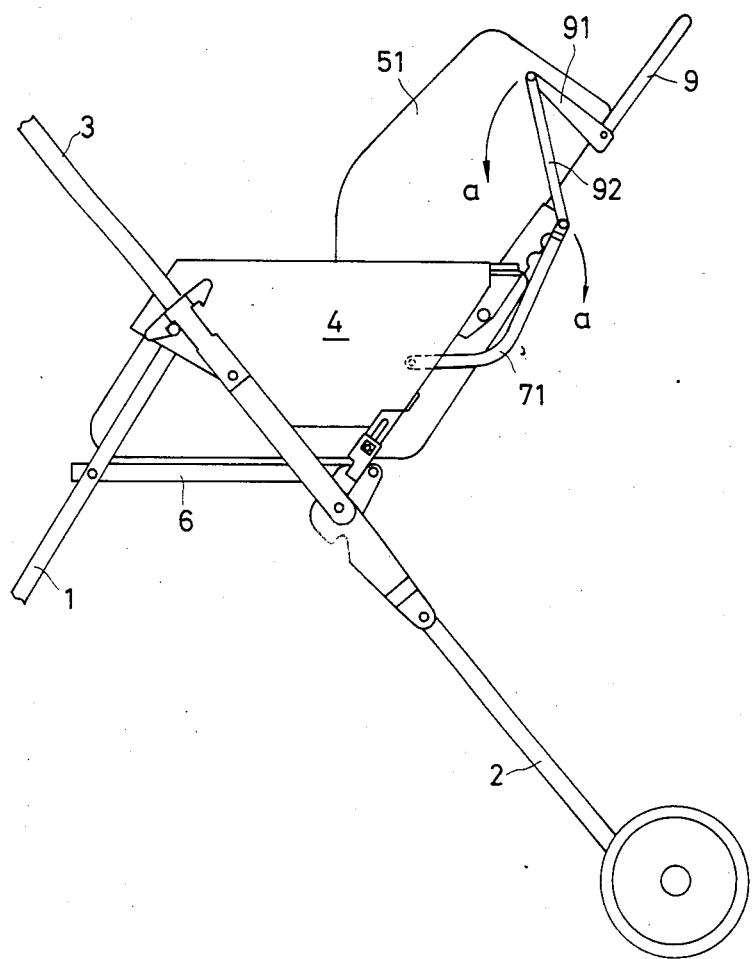
FIG. 6 is a partly cutaway side view showing the relation of the backrest and the baby head protection plate.
Figure 7:
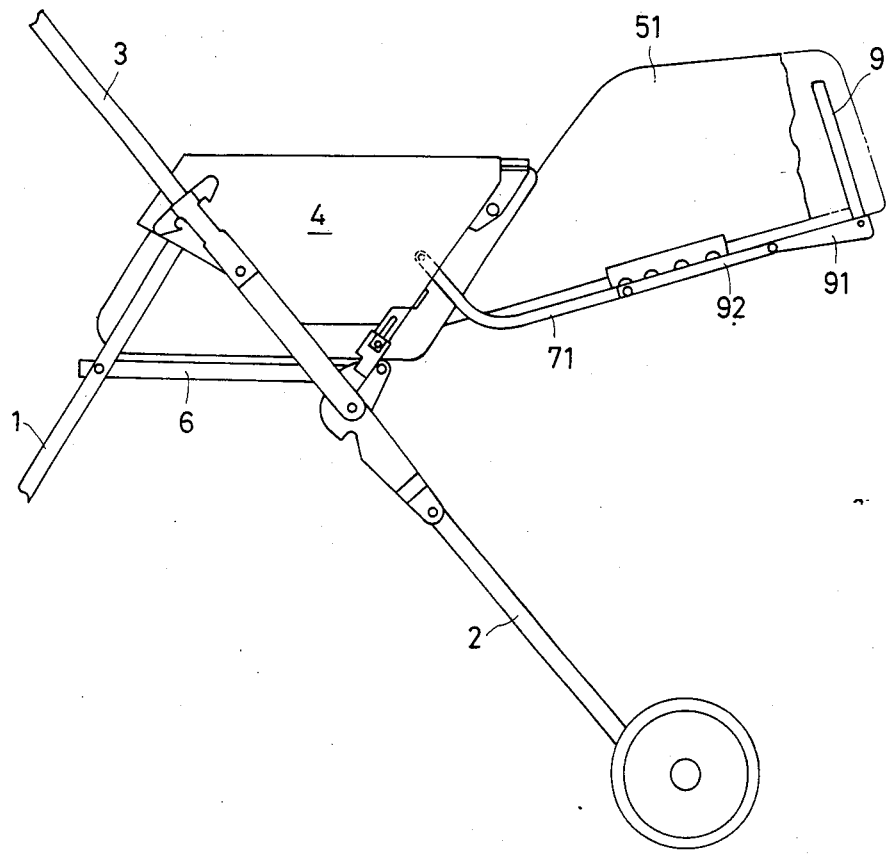
FIG. 7 is a partly cutaway side view showing the relation of the backrest and the baby head protection plate when the backrest has been lowered.

An inclination angle adjusting bar 7 is composed of a pair of frame bars 71, shown also in FIGS. 6 and 7, and a horizontal bar 72 so as to together be substantially U-shaped in front view. The pair of frame bars 71 made of a thin plate-like metal bar. The cross bar 72 is formed of a round rod-like metal bar. The base portions of the frame bars 71 are respectively pivotally attached to the center portions of the bearing bars 3' so as to be able to be raised and lowered. The cross bar 72 is engaged with an engagement/stopper mechanism 8 attached to the center of the rear surface of the backrest 5.

Figure 2:
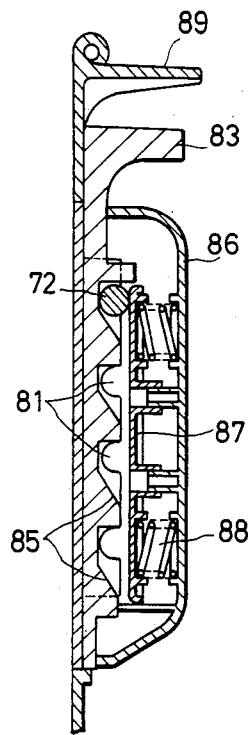
FIG. 2 is a sectional view of important parts, showing the condition that the inclination angle adjusting bar has been closely engaged with the engagement/stopper mechanism.
Figure 3:
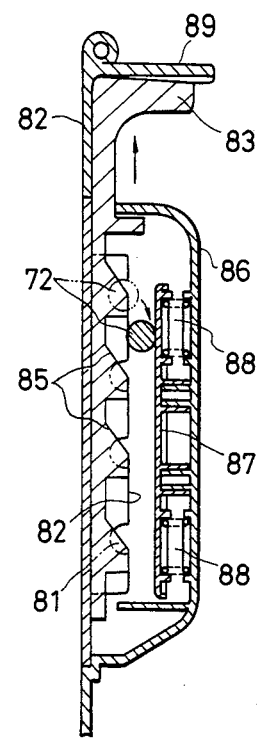
FIG. 3 is a sectional view of important parts, showing the condition that the cross bar is pushed up so as to change the engagement/stopping position of the inclination angle adjusting bar of FIG. 2.
Figure 4:
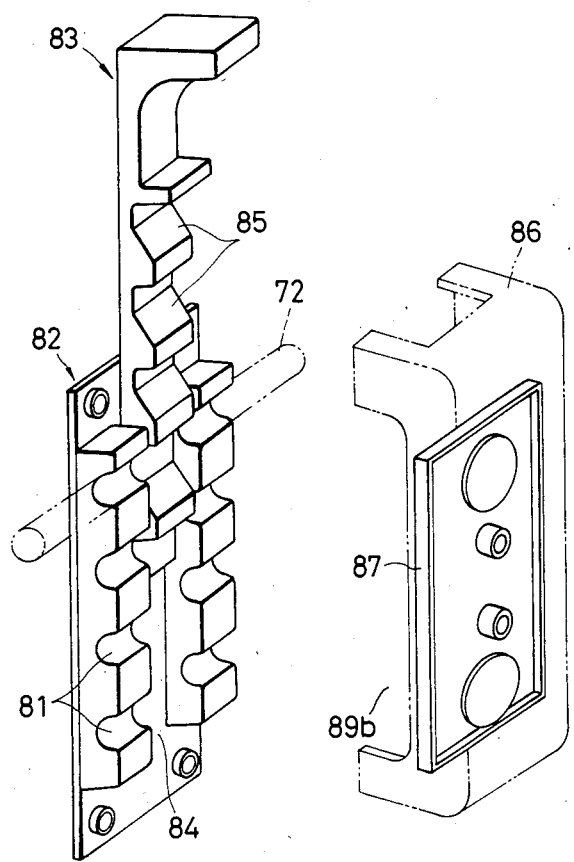
FIG. 4 is an exploded perspective view of the engagement/stopper mechanism.

The engagement/stopper mechanism 8, shown in cross section in FIGS. 2 and 3 and perspectively in FIG. 4, is constructed by a fixed plate 82 and an engagement releasing plate 83. The fixed plate 82 has a number of semicircular engagement/stopper grooves 81 which are of the size possible to engage with the cross bar 72 and are arranged at regular intervals. A slide groove 84 runs vertically at the longitudinal center of the fixed plate 82 for the purpose of sliding the engagement releasing plate 83. The engagement releasing plate 83 slides in the slide groove 84 of the fixed plate 82 and has a number of inclined surface 85 which are disposed a regular intervals corresponding to the engagement/stopper grooves 81 and are arranged to push up the cross bar 72 fitted in one of the engagement/stopper grooves 81.

It is important that the distance between adjacent ones of the inclined surfaces 85 arranged on the engagement releasing plate 82 should be kept equal to the distance between adjacent ones of the engagement/stopper grooves 81 arranged in the fixed plate 82 (see FIG. 2). In order to effectively close the central sides of the engagement/stopper grooves 81 of the fixed plate 82 with the inclined surfaces 85 by sliding the engagement releasing plate 83 for the purpose of releasing the engagement, the respective size should be so determined that the engagement/stopper grooves 81 can be blocked, as viewed from the side, at the highest position of the inclined surfaces 85 when the upper end of the engagement releasing plate 83 is slid and lifted up to about against a stopper 89 (see FIG. 3).

A cover plate 86 has notches 89b formed at both its lengthwise sides to guide the cross bar 72 to slide. A pressure plate 87 is attached to inside of the cover plate 86 to prevent the cross bar 72 fitted in an engagement/stopper groove 81 from floating out of the engagement/stopper groove 81. The cross bar 72 is always pressed down by the pressure plate 87. Springs 88 press down the pressure plate 86 against the cross bar 72. The fixed plate 82 is fixedly attached to the rear surface of the backrest 5. The stopper 89 prevents the engagement releasing plate 83 from dropping out of the fixed plate 82 owing to the oversliding of the engagement releasing plate 83 as occurring during the sliding operation. The stopper 89 is so constructed as to project from the backrest 5.

In this embodiment, the fixed plates 82 are attached to the opposite end portions of the backrest 5, the fixed plates being respectively provided with a number of engagement/stopper grooves 81 arranged at regular intervals. Such a construction prevents the cross bar 72 from being twisted to thereby make it possible to keep the cross bar 72 exactly in a horizontal state. Further, such a construction has the effect that the load of the cross bar 72 imposed upon engagement on the engagement/stopper grooves 81 can be dispersed. However, such a construction is not essential to the present invention but is preferable.

Figure 5:
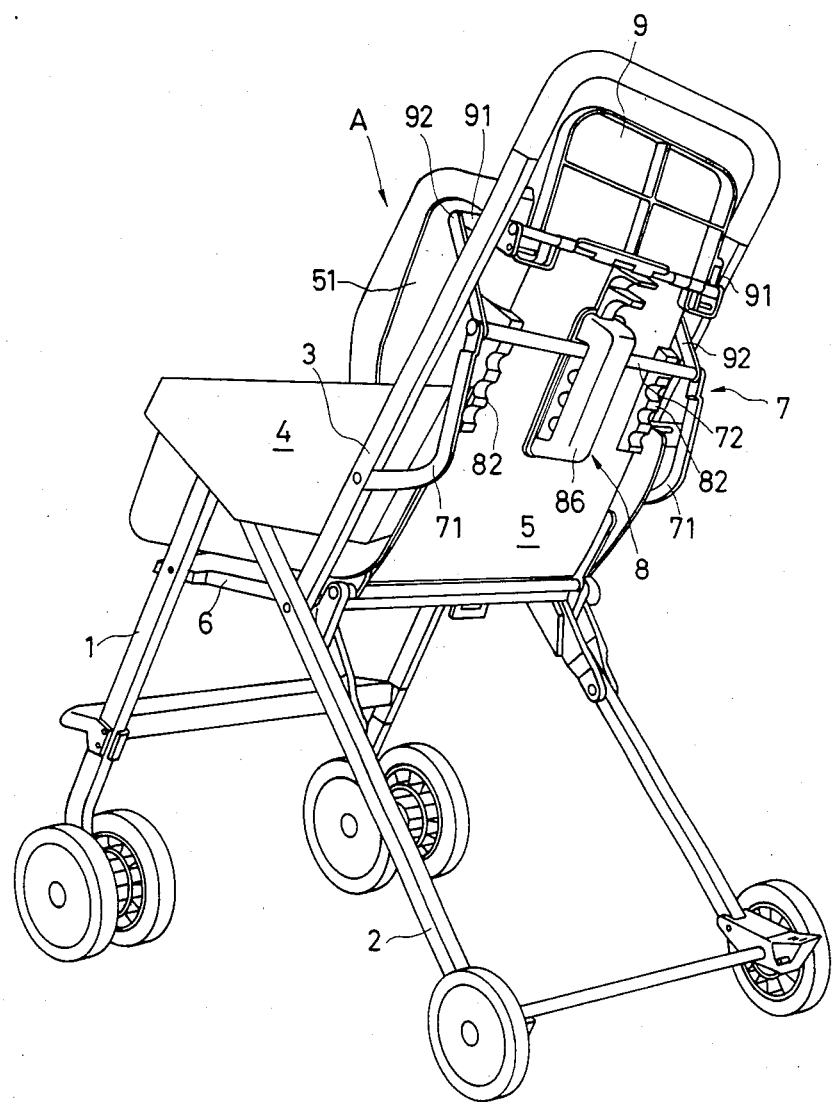
FIG. 5 is a perspective view of the baby carriage in which the attachment portions of the handle bar are respectively fixed to the side surfaces of the armrest bars.

FIG. 5 shows another embodiment in which the handle bar 3 is fixedly attached to the side surfaces of the armrest bars 4 so that the handle bar 3 cannot swing back and forth. In this embodiment, the base end portions of the frame bars 71 constituting part of the inclination angle adjusting bar 7 are respectively pivotally attached to the longitudinally middle portions of the handle bar 3 so as to be able to be raised and lowered, so that the same effect can attained.

Although the first embodiment has shown the case where the base end portions of the frame bars 71 are pivotally attached to the middle portions of the bearing bars 3' (see FIG. 1) and the other embodiment has shown the case where the base end portions of the frame bars 71 are pivotally attached to the longitudinally middle portions of the handle bar 3 (see FIG. 5), it is to be understood that the present invention is not limited to these embodiments and that such a construction is not essential to the present invention. For example, the base end portions of the frame bars 71 may be pivotally attached to the arm rest bars 4 or may be pivotally attached to other parts or members.

Next the operation of the reclining mechanism will be described in detail.

When the reclining operation has been performed, the backrest 5 is then engaged stopped by the engagement/stopper mechanism 8 as shown in FIG. 2.

Accordingly, the cross bar 72 of the inclination angle adjusting bar 7 attached to cross the engagement/stopper mechanism 8 is closely engaged and stopped at a suitable position of the engagement/stopper grooves 81 formed in the fixed plate 82. In this condition, the engagement releasing plate 83 fitted in the slide groove 84 formed at the center of the fixed plate 82 is subjected to downward force along the slide groove 84 because of its own weight, so that the lowest position of one of inclined the surfaces 85 is in contact with the cross bar 72. As the result, the operation of pushing up the cross bar 72 is not made. Further, the cross bar 72 closely engaged and stopped by the engagement/stopper groove 81 is always pressed by the pressure plate 87 attached to the inside of the cover plate 86 to thereby prevent the cross bar 72 from floating up and out of the engaged groove 81.

When a reclining operation is to be applied to the backrest 5 being in the above-described condition, the upper end of the engagement releasing plate 83 is pulled up from the position of FIG. 2 to the position shown in FIG. 3. By pulling up the engagement releasing plate 83, the position at which the cross bar 72 contacts the inclined surface 85 on the engagement releasing plate 83 is shifted from the lower position to the higher position. At the higher position, the cross bar 72 is pressed up against the spring force of the pressure plate 87, as shown in FIG. 3, so that the cross bar 72 is finally disengaged from the engagement/stopper groove 81.

When the cross bar 72 is in contact with the highest position of the inclined surface 85 on the engagement releasing plate 83 so as to push up the cross bar 72, all the inclined surfaces 85 block all the engagement/stopper grooves 81 (see FIG. 3). Accordingly, the cross bar 72 can not be fittingly engaged and stopped by any one of the engagement/stopper grooves 81. If an appropriate inclination angle is selected under this blocked condition by rotating the back rest 5 and thereafter the engagement releasing plate 83 is released from its lifted state, the reclining angle of the backrest 5 can be changed very easily but thereafter firmly established.

When the reclining operation for the backrest 5 is to be made again thereafter, the purpose can be easily attained by repeating the aforementioned procedure.

Being arranged as described above, according to the present invention, reclining can be easily made by only a single-handed operation of the engagement releasing plate 83 included in the engagement/stopper mechanism 8 since the lock releasing and rotation of the backrest 5 can be performed with one hand. Therefore, the problems in the conventional baby carriages, such as the complexity in handling, the difficulty of single-handed operation, and so on, can be completely solved.

Next the mechanism of raising and lowering the baby head protection plate attached to the upper end of the backrest will be described in detail.

As shown in both FIGS. 1 and 5, a baby head protection plate 9 is pivotally attached to the upper end of the backrest 5 so as to be able to be raised and lowered. The width of the baby head protection plate 9 is equal or neatly equal to that of the upper end of the backrest 5, so that the upper end of the backrest 5 can be closed off by the plate 9.

As shown best in FIGS. 6 and 7, driving arms 91 are provided for raising and lowering the baby head protection plate 9. The driving arms 91 have base ends fixed to the opposite ends of the baby head protection plate 9 so as to project from the main surface of the baby head protection plate 9 and have free ends respectively pivotally attached to the upper ends of movable links 92. The baby head protection plate 9 can be raised and lowered by moving the movable links 92.

The lower ends of the movable links 92 are respectively pivotally attached to the frame bars 71 of the inclination angle adjusting bar 7.

When the inclination angle of the backrest 5 is in the upright state, the connection of the driving arms 91, the movable links 92 and the frame bars 71 is in a state that the baby head protection plate 9 extends parallel from the end of the backrest 5 (see FIG. 6). When the inclination angle of the backrest 5 is made nearly horizontal and is extends nearly parallel from the rear of the seat 6 as if it was a bed, the driving arms 91, the movable links 92 and the frame bars 71 are connected in an angular relation such that the baby head protection plate 9 perpendicularly projects from the backrest 5 (see FIG. 7).

When the frame bars 71 are pulled down (when the backrest 5 is lowered into the flat state), the movable links 92 respectively connected to the top ends of the frame bars 71 are also respectively pulled down toward the frame bars 71 so that the driving arms 91 swing in the direction of the arrow a of FIG. 6. On the contrary, when the frame bars 71 are pressed up (when the backrest 5 is raised), the movable links 92 and the driving links 91 are operated in reverse to the above relation.

The baby head protection plate 9 arranged as described above operates a follows. If the state of the backrest 5 is to be changed from the raised state into the lowered or flat state by changing the engagement/stopped position of the cross bar 72 attached to the rear surface of the backrest 5, the top ends of the frame bars 71 pivotally attached at their base ends to the handle bar 3 or the bearing bars 3' are operated in response to this change so that the top ends are pulled down. This operation follows the pulling down operation of the movable links 92 connected to the frame bars 71. The operation of the movable links 92 induces the lowering of the driving arms 91 connected to the top ends of the movable links 92. As a result, the baby head protection plate 9 kept in a state that it is elongated longitudinally along the backrest 5 is raised perpendicularly to the lengthwise direction of the backrest 5 to thereby close the upper end opening portion of the backrest 5 closed.

Further, the operation reverse to the aforementioned operation can be automatically made by raising the inclination angle of the backrest 5. That is, when the backrest 5 is completely raised, the head protection plate 9 previously closing the upper end opening portion of the backrest 5 pushes up the frame bars 71 as the backrest 5 is raised. The operation of the frame bars 71 pushes up the movable links 92. Further, the operation of the movable links 91 raises the driving links 91. As a result, the baby head protection plate 9 is positioned longitudinally along the backrest 5 as shown in FIG. 6.

This embodiment shows the case where the frame bars 71 are respectively connected to the opposite ends of the cross the rear surface of the backrest 5. Therefore, the frame bars 71 function as an inclination angle adjusting bar 7 so that the operation of raising and lowering the head protection plate 9 is combined with the inclination angle adjusting operation. Nonetheless, it is optional whether the frame bars 71 are arranged to satisfy the two functions or whether the frame bars 71 are arranged to satisfy only one function of raising and lowering the head protection plate 9. Of course, the arrangement of this described embodiment is superior in that the frame bars 71 can be used for operating the two different mechanisms of raising and lowering the backrest 5 and raising and lowering the head protection plate 9.

Although this embodiment shows the case where the lower ends of the movable links 92 are respectively pivotally attached to the upper ends of the frame bars 71, it is a matter of course that the invention is not limited thereto and that the objects of the invention can be attained by pivotally attaching the movable links 92 to appropriate positions of the cross bar 72.

Being arranged as described above, the present invention is such that, when the backrest 5 is reclined like a bed, the upper end opening of the backrest 5 is closed by the baby head protection plate 9 erected by the cooperation of the driving arms 91 and the movable links 92 linked to the inclination angle adjusting bar 7. Accordingly, if the baby laid on the backrest 5 flattened like a bed moves toward the upper portion of the backrest 5 due to vibrations of the baby carriage or the like, the head of the baby comes into contact with the baby head protection plate 9 so that the baby cannot move upwards any more. Therefore it is possible to prevent accidents, such as an accident which causes sudden pressure on the neck of the baby by the exposure of the head out of the upper end of the backrest 5 and an accident of dropping the baby out of the backrest 5 caused by the upward movement of the body of the baby. In this viewpoint, the invention has excellent effects which could not be expected with the conventional baby carriages.

Further, when the backrest 5 is in the erected state, the upper end of the backrest 5 is opened but the head of the baby is not exposed out of the upper end of the backrest. Accordingly, not only is there no fear of troubles caused by opening the upper end of the backrest 5, but also the condition of the baby can be inspected through the opening at the top of the backrest 5. The baby carriage according to the present invention can be used as safely as the conventional baby carriages can.

Figure 8:
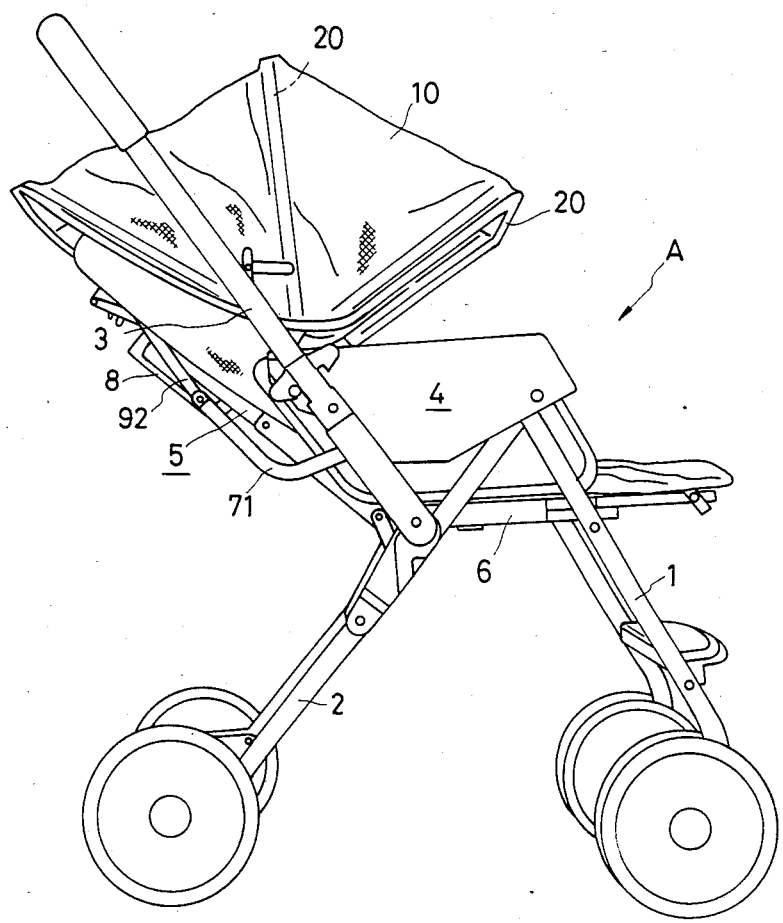
FIG. 8 is a side view of the baby carriage showing the condition that a hood is attached to the armrest bars and that an extension mechanism is provided at the front end of the seat.

FIG. 8 shows a modification of the baby carriage A of this embodiment, in which a hood is attached to the armrest bars and in which an extension mechanism is provided at the to end of the seat.

First, the attachment of the hood will be described with reference to FIGS. 9 through 11.

Figure 9:
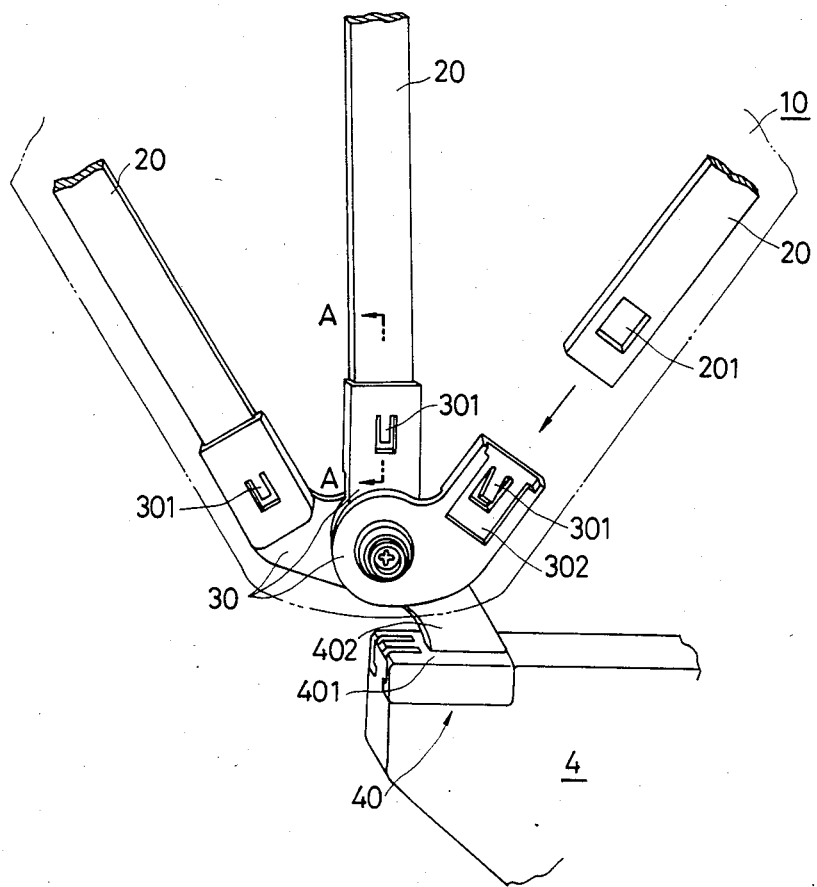
FIG. 9 is a partly cutaway perspective view showing important parts when the hood is attached.

In this invention, as shown in FIG. 9, the hood includes several hood ribs 20 inserted into a hood sheet 10 for stoppage. Supports or arms 30 are respectively engaged with the opposite end so the hood ribs 20. Fixing members 40 pivotally attach the supports or arms 30.

The hood sheet 10 is made of cloth material, such as canvas or the like, and is so arranged that the upper half of the baby seated on the baby carriage A can be covered with the hood sheet 10. The several hood ribs 20 are inserted into the hood sheet 10 for stoppage so that the hood ribs are disposed at appropriate intervals frontward and backward.

Figure 10:
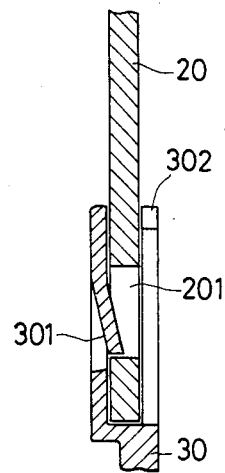
FIG. 10 is a section a view along the line A—A of FIG. 9.

Each of the hood ribs 20 is substantially U-shaped in front view and has fitting holes 201, shown in cross section in FIG. 10, formed in the vicinity of its opposite ends. Stopper projections 301 formed on the arms 30 can be respectively fitted into the fitting holes 210. fitting grooves 302 U-shaped in planar view for fit/engagement are respectively formed in the upper ends of the supports or arms 30 and fit and engage with the hood ribs 20. The engagement/stopper projections 301 are provided as part of the fitting grooves 302 so that the engagement/stopper projections 301 project inward from the grooves 302.

It is preferable that the engagement/stopper projections 301 are formed by use of part of the walls constituting the fitting grooves 302, but the invention is not limited thereto. For examples, the engagement/stopper projections 301 may be provided on the hood rib 20 side, and the fitting grooves 201 engaged with the engagement/stopper projections 301 may be provided on the support or arm 30 side. In this example, the objects of the invention can be attained by fittingly inserting the supports or arms 30 into the fitting grooves 302 so as to engage the each other.

Figure 11:
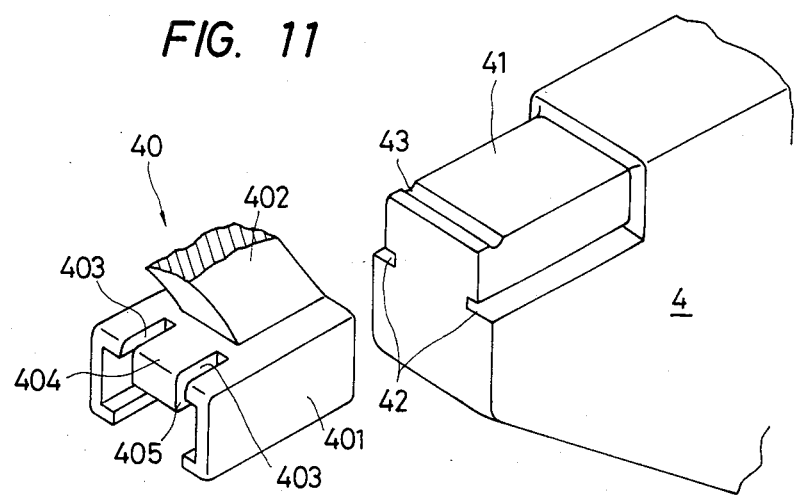
FIG. 11 is an exploded perspective view of important parts of FIG. 9.

As shown in FIG. 11, each of the fixing members 40 has a pedestal 401 removably attached to the rear end of the armrest bar 4 as a constituent member of the baby carriage body A. A prop 402 provides for pivotally attaching the supports or arms 30 of FIG. 9 to the upper surface of the pedestal 401.

The pedestal 401 in each of the fixing members 40 is U-shaped in section or shaped like a channel. Two notches 403 of small width are provided in the top surface of the pedestal 401 other than the portion forming the support or arm 402. By forming the notches 403, an engagement/stopper projection 404 is formed between the notches. The engagement/stopper projection 404 is provided with an engagement/stopper stripe 405 formed at an appropriate position on the lower surface thereof. Further, the engagement/stopper projections 404 is normally urged down at its end portion. When the engagement/stopper projection 404 is not fitted with the armrest bar 4, the end portion including the engagement/stopper projection portion 404 is inclined down.

A fitting portion 41 is formed at the rear end of an armrest bar. The U-shaped portion of the fixing member 40 is fitted into a pair of slide grooves 42 provided in the top surface and opposite sides of the armrest bar 4. An engagement/stopper groove formed in the rear end of the top surface of the armrest bar 4. When the fixing member 40 is set up in the proper direction (in the direction of front and back), the engagement/stopper stripe 405 formed on the rear bottom surface of the engagement/stopper projection 404 of the fixing member 40 can be fitted into the engagement/stopper groove 43.

According to the attachment of the hood constructed as described above, assembly work can be easily made by such a simple operation that the end portion of the hood rib 20 holding the hood sheet 10 is fitted into the fitting groove 302 formed in the support or arm 30. Accordingly, the hood assembly work is free from the conventional troublesome process that the opposite ends of the hood rib holding the sheet needs to be fixed to the pivot of the pedestal. Further, the hood rib 20 has the fitting holes 201 in the vicinity of its opposite ends. Accordingly, when the hood rib 20 is inserted into the fitting groove 302, the engagement/stopper projection 301 provided on the fitting groove 302 is fitted into the fitting hole 201 so that the projection 301 and the hole 201 can be tightly combined with each other and cannot be disconnected.

When dust or stain deposited on the hood sheet 10 should be washed out, the engagement of the hood rib 20 with the support or arm 30, shown in FIG. 9 can be easily released by a simple operation of disengaging the engagement/stopper projection 301 from the fitting hole 201 while pushing down the engagement/stopper projection 301 provided on the fitting groove 302. After being released, the hood rib 20 is still inserted into the sheet 10. However, the hood rib 20 has no projecting portion. Accordingly, the ribs 20 can be easily pulled off the hood sheet 10 so that only the sheet 10 can be washed.

Further, the fixing member 40 is fitted with the armrest bar 4, and then the supports or arms 30 engaged with the hood ribs 20 are combined at one place and pivotally attached one place to the upper end of the prop 402 provided on the upper surface of the fixing member 40. Accordingly, the area protected against the sun can be adjusted by changing the position where the hood ribs are disposed regardless of the inclination angle of the backrest 5.

Further, the hood can be easily mounted and demounted by such a simple operation that the pedestal 401 to be formed U-shaped or channel-like in section in order to couple to the fixing member 40 is slid in or out of the engagement grooves 42 formed in the rear end of the armrest bar 4.

Next, the extension mechanism provided at the front end of the seat will be described with reference to FIGS. 12 through 15. This embodiment is so arranged that an extension portion further provided at the front end of the seat can be extended so as to be used as a foothold for the baby according to necessity.

Figure 12:
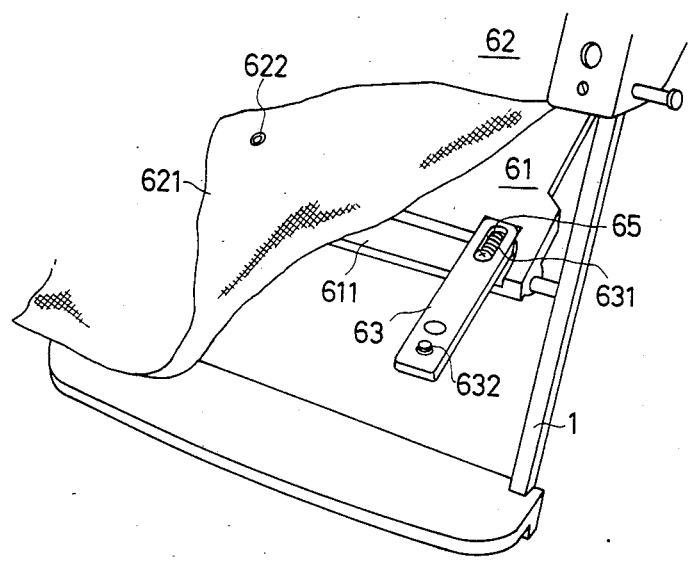
FIG. 12 is a partly cutaway perspective view showing the relation of an extension bar and an elongated portion of the seat when the extension bar is extended.

As shown in FIG. 12, the seat 6 which is interposed between the front leg bars 1 and the rear leg bars 2 constituting the body of the baby carriage, comprises a seat board 61 made of hard synthetic resin or the like and a seat cloth 62 attached to the surface of the seat board 61 to cover it.

Figure 13:
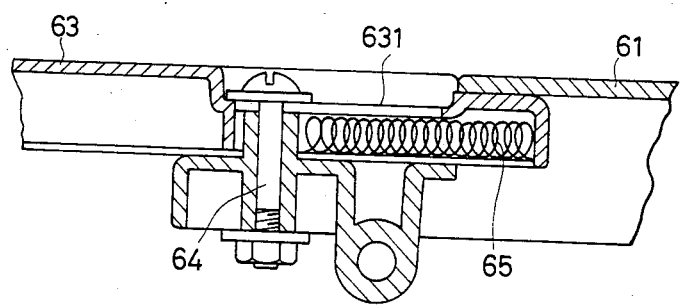
FIG. 13 is a partly cutaway enlarged sectional view showing the condition that a spring is disposed within the extension bar.

A pair of extension bars 63 are respectively fitted into a fitting groove 611 which is formed in the front end of the seat 61 so as to be substantially bent perpendicularly inward at its opposite ends. Each of the extension bars 63 is so arranged as to be able to be projected and retracted so that, when projected, it becomes extended while, when retracted, it is housed in the fitting groove 611. Each of the extension bars 63 constituted by a bar body substantially U-shaped in section is pivotally attached, as shown in FIG. 13, onto the seat board 61 by a pivot screw 64 inserted into a slot 631 of a predetermined size in the base end of the bar body. The pivot screw 64 is so mounted as to be standing on the upper surface of the seat board 61.

A spring 65 is disposed to keep its expanding force between the pivot screw 64 and the base end of he rear surface of the extension bar 63. In either one of the extended (or projected) state and the retracted (or housed) state, the expanding force of the spring 65 acts on the extension bar 63 so that the extension bar 63 can be normally attracted toward the pivot screw 64. Although this embodiment shows the case where the force of the spring 65 is used as expanding force, the invention is not limited thereto, but, on the contrary, the projected/housed state of the extension bar 63 may be kept by contracting force of the spring 65.

After the spring 65 is mounted, it is necessary that the slot 631 is closed with a tape (not shown) or the like. By closing the slot 631, various troubles, for examples, penetration and deposition of dust into the slot 631, caused by the exposure of the spring 65 can be effectively prevented.

The width of the fitting groove 611, which is U-shaped in plan and formed in the front end of the seat 61, conforms with that of the extension bars 63. Further, the depth of each of engagement/stopper grooves 612 respectively formed at the perpendicularly bent opposite end portions of the fitting groove 611 so as to form an L-shape conforms with the length of the base end portion of the extension bar 63 where the slot 631 is formed.

Figure 14:
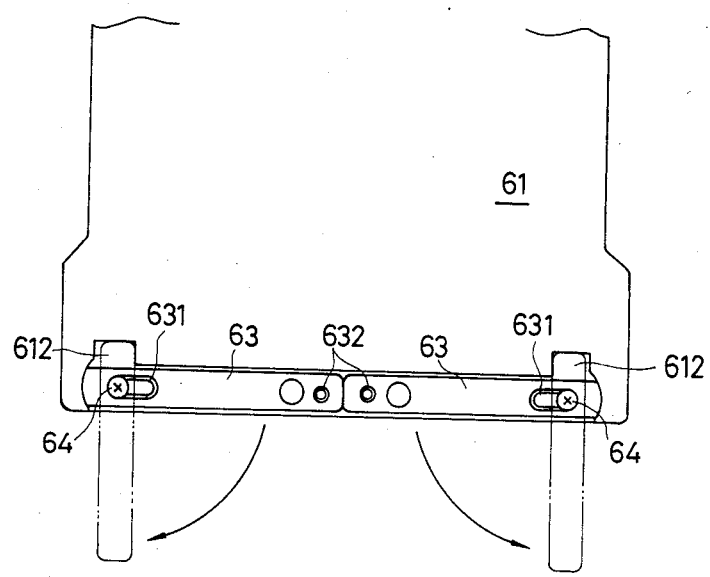
FIG. 14 is a partly cutaway plan view of the seat board showing the condition that two extension bars are housed in the seat board.
Figure 15:
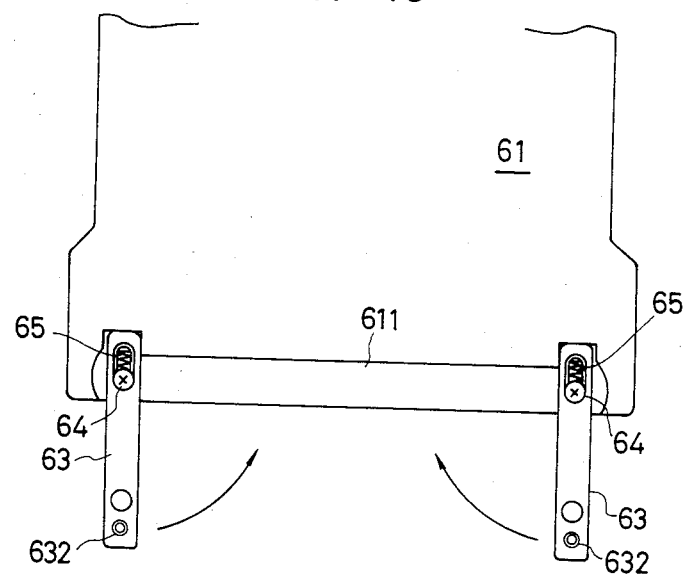
FIG. 15 is a partly cutaway plan view of the seat board showing the condition that the extension bars are extended/erected.

Preferably, the end of a portion where the laterally elongated fitting groove 611 and each of the perpendicularly bent engagement/stopper grooves 612 intersect each other is formed so as to be circularly bent as illustrated in FIGS. 14 and 15 on one hand. The base end of each of the extension bars 63 is also circularly formed corresponding to the above-described end, so that the operation of erecting/housing the extension bar 63 can be made very smoothly.

As shown in FIG. 12, the seat cloth 62 has an extension portion 621 continued at its front end. The length of the extension portion 621 is set so as to be little longer than that of the extension bar 63, so that fastening members 622 attached to the rear surface of the extension portion can be respectively snapped with fastening members 632 attached to the top ends of the extension bars 63.

The extension mechanism of the seat arranged as described above has the effects as follows:

(1) The case where the extension bars 63 are in the housed state.

In this case, as illustrated in FIG. 14, the extension bars 63 respectively attached to the front ends of the seat board 61 are in the retracted state and are housed in the fitting groove 611 formed in the front end of the state board 61. Accordingly, the extension portion 621 continued to the front end of the seat cloth 62 hangs down from the front end of the seat board 61.

(2) The case where the extension bars 63 are to be extended.

In this case, the extension bars 63 as illustrated in FIG. 14 are pivotally raised in the direction of the arrows to thereby be extended. These pivotal motions are made against the expanding force of the springs 65 included in the extension bars 63. The extension bars 65 thus erected or extended to the positions perpendicular to the front end of the sate boards 61 by the pivotal motions, are exactly kept in the projected state by the spring force of the springs 65 acting on the base ends so that the base ends are drawn into the L-shaped engagement/stopper grooves 612 respectively formed at the opposite ends of the fitting groove 611.

The operation of drawing the extension bars 63 into the engagement/stopper grooves 612 is automatically carried out by the spring force of the springs 65 respectively interposed between the pivots 64 and the extension bars 63.

(3) Extension (lifting) of the extension portion 621.

The extension portion 621 continued to the front end of the seat cloth 62 and hanging down from the front end of the seat board 61, is automatically lifted up as the extension bars 63 are extended. Pivotal erection of the extension bars 63 is carried out at the rear surface of the extension portion 621. By the pivotal movement of the extension bars 63, the extension portion 621 is lifted up with successive contacting from the base end to the top end. When the operation of extending the extension bars 63 is completed, the operation of extending the extension portion 621 is completed.

The thus lifted extension portion 621 is tightly engaged with the extension bars 63 by snapping the fastening members 622 attached to the opposite ends of the rear surface of the extension portion 621 to the fastening members 632 attached to the top ends of the extension bars 63. Thus, the operation of extending the seat is completed.

(4) Foothold for the baby.

If the baby seated on the seat 6 stretches out his legs, his legs up to the knees are supported by the extension portion 621 from the rear surface thereof as long as the seat cloth 62 is extended. Accordingly, there is no possibility of inducing the problems in the conventional baby carriages, such as, for example, the problem that the baby's veins at the rear surface of the knee are pressed by the top ends of the seat. Accordingly, when the inclination angle of the backrest 5 is lowered like a bed, the baby can stretch his legs without the smallest strain and can be kept in a stable state.

(5) Simplicity of the construction

The extension bars 63 are attached to the top ends of the seat board 61 merely so as to be able to be rotatable, and the extension portion 621 is merely continued to the front end of the seat cloth 62. Accordingly, when the extension bars 63 are out of use, the extension bars 63 can be housed in the seat board 61 so as not to be exposed outside. Accordingly, an attractive outside appearance can be obtained. Further, when the extension bars are out of use, the extension portion 621 continued to the front end of the seat cloth 62 can hang down from the front end of the seat board 61. Accordingly, the extension portion 621 can function as a cloth for protecting the calves of the baby with his legs hanging over the edge. As described above, the operation of the extension mechanisms is simple, and there is the excellent effect that the legs of the baby are always protected both when the extension bars are extended and when housed.

What is claimed is:

1. A baby carriage, comprising:
   a baby carriage body comprising a seat for supporting a baby and a plurality of wheels supporting said seat;
   a reclinable backrest connected to said seat for supporting a back of said baby;
   an engagement/stopper mechanism attached to a rear surface of said backrest and having a cover with a notch at a lateral side thereof; and
   an inclination angle adjusting bar of substantially a U-shape in front view comprising;
   frame bars pivotally attached at opposite ends thereof to said body of said baby carriage, and
   a cross bar crossing a rear surface of said backrest and slidable through said notch of said cover and selectively and releasably engaged and stopped at predetermined positions with said engagement/stopper mechanism, wherein said engagement/stopper mechanism comprises a fixed plate having a plurality of horizontal engagement/stopper grooves and an engagement releasing plate slidably attached to fixed plate and wherein said cross bar is engageable with a selected one of said grooves and releasable by a sliding of said engagement releasing plate; and
   wherein said engagement releasing plate has inclined surfaces formed on a side remote from said backrest for releasing engagement of said cross bar from said grooves.

2. A baby carriage as recited in claim 1, wherein said grooves each comprise a right hand groove aligned with a left hand groove with part of a gap at a center of said fixed plate therebetween and wherein said engagement releasing plate slides in said gap.

3. A baby carriage as recited in claim 1, wherein said inclined surfaces of said engagement releasing plate are arranged with separations corresponding to separations of said engagement/stopper grooves in said fixed plate.

4. A baby carriage as recited in claim 1, wherein said fixed plate of said engagement/stopper mechanism is fixed on said backrest and disposed within said cover plate.

5. A baby carriage as recited in claim 6, further comprising a pressure plate facing said cross bar, said fixed plate and said engagement releasing plate from an inside of said cover and at least one spring normally pressing said pressure plate away from said cover.

6. A baby carriage as recited in claim 5, wherein said engagement/stopper mechanism further comprises two additional fixed plates having said plurality of horizontal engagement/stopper grooves and disposed near lateral sides of said backrest.

7. A baby carriage as recited in claim 1, further comprising:
   a head protection plate pivotally attached to an upper end of said backrest for selectively closing said upper end of said backrest; and
   closing means for raising and lowering said head protection plate in response to a movement of said inclination angle adjusting bar.

8. A baby carriage as recited in claim 7, wherein said closing means comprises:
   driving arms having respective first ends fixed to said head protection plate; and
   movable links having respective first ends pivotally connected to said inclination angle adjusting bar and second ends pivotally attached to respective second ends of said driving arms.

9. A baby carriage as recited in claim 8, wherein said movable links are pivottable about a common axis of pivoting of said frame bars.

* * * * *